United States Patent
Pretorius et al.

(10) Patent No.: US 8,087,586 B2
(45) Date of Patent: Jan. 3, 2012

(54) RFID TRANSPONDER TRANSMITTING CONCATENATION OF PAGES

(75) Inventors: Albertus Jacobus Pretorius, Pretoria (ZA); Hendrik Lodewyk Van Eeden, Pretoria (ZA); William Hendrik Hofmeyr, Pretoria (ZA)

(73) Assignee: IPICO South Africa (Pty) Limited, Centurion (ZA)

( * ) Notice: Subject to any disclaimer, the term of this patent is extended or adjusted under 35 U.S.C. 154(b) by 283 days.

(21) Appl. No.: 12/442,082

(22) PCT Filed: Sep. 20, 2007

(86) PCT No.: PCT/IB2007/053816
§ 371 (c)(1),
(2), (4) Date: Jun. 9, 2009

(87) PCT Pub. No.: WO2008/035308
PCT Pub. Date: Mar. 27, 2008

(65) Prior Publication Data
US 2010/0019039 A1 Jan. 28, 2010

(30) Foreign Application Priority Data

Sep. 20, 2006 (ZA) .................................. 2006/07873

(51) Int. Cl.
*G06K 7/08* (2006.01)
*G06K 19/00* (2006.01)
*G06K 19/06* (2006.01)
*G06K 7/00* (2006.01)
*G08B 13/14* (2006.01)
*G05B 11/01* (2006.01)
*G05B 19/00* (2006.01)

(52) U.S. Cl. ........ 235/435; 235/449; 235/451; 235/487; 235/492; 340/572.1; 340/5.61; 340/12.5; 340/12.51

(58) Field of Classification Search ................... 235/449, 235/435, 451, 487, 492; 340/572.1, 4.61, 340/12.51, 12.5
See application file for complete search history.

(56) References Cited

U.S. PATENT DOCUMENTS

| 6,154,136 | A  | * | 11/2000 | Van Eeden ................ 340/572.1 |
| 6,480,100 | B1 | * | 11/2002 | Frieden et al. ............ 340/10.1 |
| 7,336,179 | B2 | * | 2/2008  | Kashiwase ................ 340/572.1 |
| 7,576,651 | B2 | * | 8/2009  | Jin et al. .................. 340/572.1 |
| 7,760,096 | B2 | * | 7/2010  | Jin et al. .................. 340/572.1 |

(Continued)

FOREIGN PATENT DOCUMENTS

EP 0837412 A2 4/1998

(Continued)

*Primary Examiner* — Daniel Walsh
(74) *Attorney, Agent, or Firm* — The Webb Law Firm

(57) ABSTRACT

Disclosed is a transponder of a radio frequency identification system. Connected to a controller is a memory storing r-pages of k-bits of data. A first page includes an ID code relating to an integrated chip forming part of the transponder. The controller is configured, after the transponder has been interrogated by a reader, automatically and on a transponder talk only basis, to transmit transponder ID data including a concatenation of pages. Each page is led by a respective m-bit header. The header includes: (a) a first part having a random number, (b) a second part having for the first page in the ID data, a total number of pages in the ID data and for any subsequent page, a page number of the page in the memory and; (c) a third part having a sequential number for the page in the ID data.

9 Claims, 4 Drawing Sheets

U.S. PATENT DOCUMENTS

Figure 1:
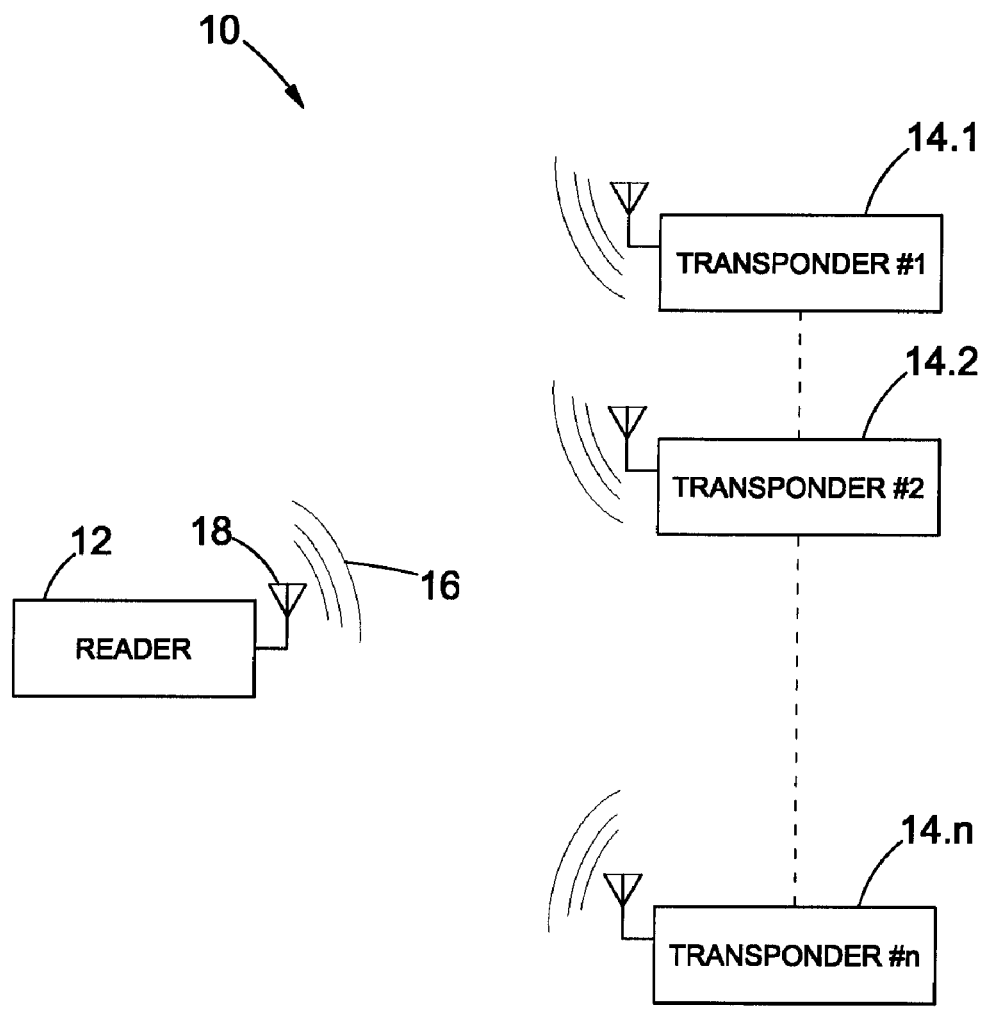

| | | | |
|---|---|---|---|
| 2002/0026523 A1* | 2/2002 | Mallory et al. | 709/236 |
| 2002/0059420 A1* | 5/2002 | Lin et al. | 709/224 |
| 2002/0063622 A1* | 5/2002 | Armstrong et al. | 340/10.31 |
| 2002/0130766 A1* | 9/2002 | Hulvey | 340/10.31 |
| 2003/0001009 A1* | 1/2003 | Collins et al. | 235/385 |
| 2003/0112128 A1* | 6/2003 | Littlechild et al. | 340/10.52 |
| 2005/0212693 A1* | 9/2005 | Friedrich | 342/42 |
| 2006/0087434 A1* | 4/2006 | Kashiwase | 340/572.1 |
| 2007/0030126 A1* | 2/2007 | Friedrich | 340/10.2 |
| 2007/0052523 A1* | 3/2007 | Jin et al. | 340/10.2 |
| 2009/0278664 A1* | 11/2009 | Jin et al. | 340/10.1 |
| 2011/0041046 A1* | 2/2011 | Kang et al. | 714/807 |

FOREIGN PATENT DOCUMENTS

| | | |
|---|---|---|
| WO | 9916015 | 4/1999 |
| WO | 0184518 A1 | 11/2001 |

* cited by examiner

RFID TRANSPONDER TRANSMITTING CONCATENATION OF PAGES

INTRODUCTION AND BACKGROUND

This invention relates to radio frequency identification (RFID) systems and more particularly to a transponder of the system and the format of data in a response signal transmitted by the transponder forming part of the system.

RFID systems wherein a plurality of transponders are read by a reader, are well known in the art. In one known system, the reader broadcasts an interrogation signal. The transponders respond with respective response signals comprising transponder ID data. The response signals are received and the ID data read by the reader, thereby automatically to identify articles on which the transponders are mounted and/or to count those articles. Various protocols are known to avoid collisions between the respective response signals, or to mitigate the effect of signal corruption due to such collisions. Often the transponder ID data may comprise a plurality of blocks or pages of data, which pages are of equal length, typically 64 bits. In such systems, where a plurality of transponders are read simultaneously, it may be difficult for the reader to determine which page has been received from which transponder.

OBJECT OF THE INVENTION

Accordingly, it is an object of the present invention to provide a system, transponder and method with which the applicant believes the aforementioned disadvantages may at least be alleviated.

SUMMARY OF THE INVENTION

According to the invention there is provided a transponder of a radio frequency identification system comprising;
   a controller;
   a memory arrangement connected to the controller and for storing r-pages of k-bits of data each, a first page of the r-pages comprising an ID code relating to an integrated chip forming part of the transponder; and
   the controller being configured, after the transponder having been energized by a reader, to transmit transponder ID data comprising a concatenation of pages comprising the first page and at least one other page, and wherein each page is led by a respective m-bit header.

The transponder may be configured to transmit the transponder ID data according to a transponder talks only protocol. The transponder ID data may be transmitted in the form of a substantially continuous bit stream. The transponder ID data may be retransmitted at inter-transmission intervals.

The header may comprise one or more of a p-bit first part, a q-bit second part and an s-bit third part. Any suitable value may be assigned to any of r, k, m, p, q and s. For example, the first part p may comprise an 8-bit random number generated by a random number generator (RNG) connected to the controller. The header preferably comprises at least the first part and one or more of the second part and the third part. The second part may comprise a 4-bit number, which may, in the case of the header for the first page, be a total number of pages in the transponder ID data and in the case of any other subsequent page, a page number of the page in the memory arrangement. The third part may comprise 2-bits comprising in each case a sequential number of the page in the transponder ID data.

The invention also includes within its scope a RFID system comprising a reader and at least one transponder as herein defined and/or described.

Further according to the invention there is provided a method of reading a transponder forming part of a radio frequency identification system, the method comprising the steps of:
   causing an interrogation signal to be received at the transponder;
   causing the transponder to transmit a response signal comprising transponder ID data comprising a concatenation of pages comprising a first page and at least one other page, and wherein each page is led by a respective header.

BRIEF DESCRIPTION OF THE ACCOMPANYING DIAGRAMS

Figure 2:
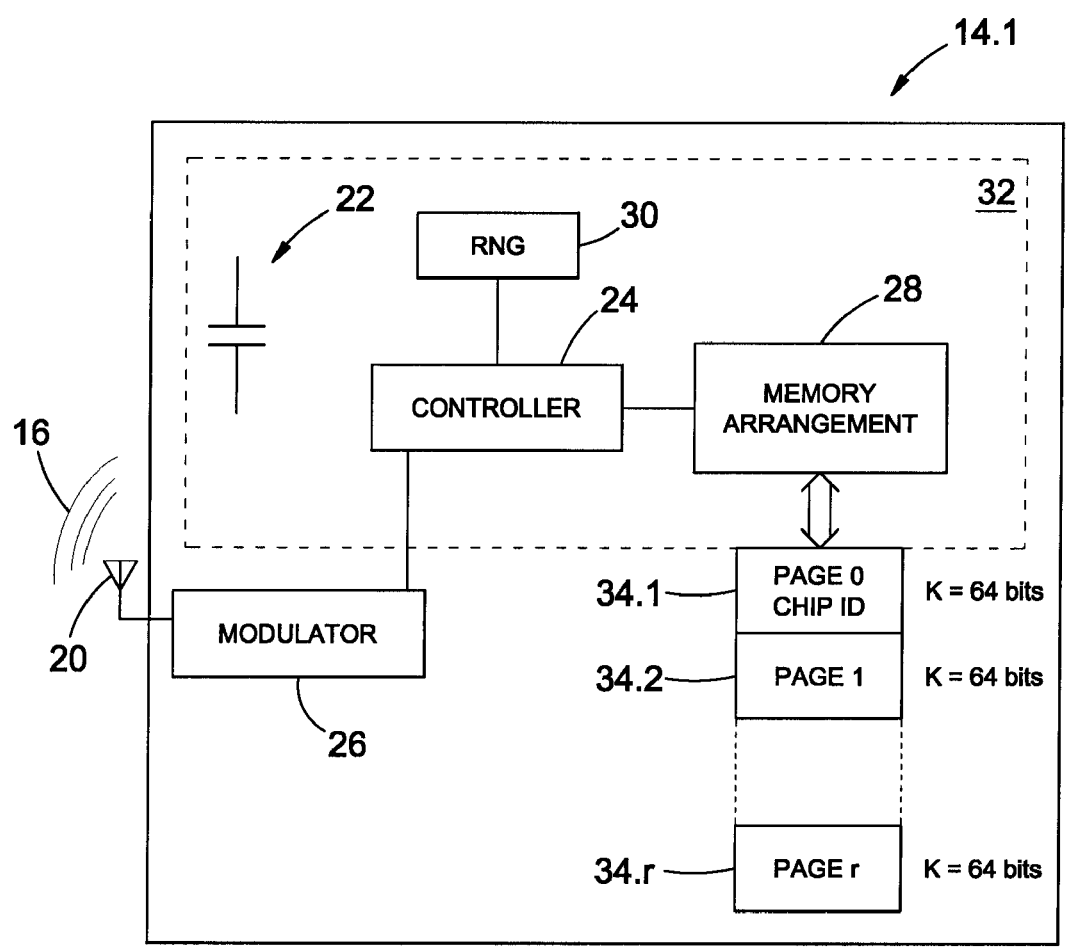
Figure 3:
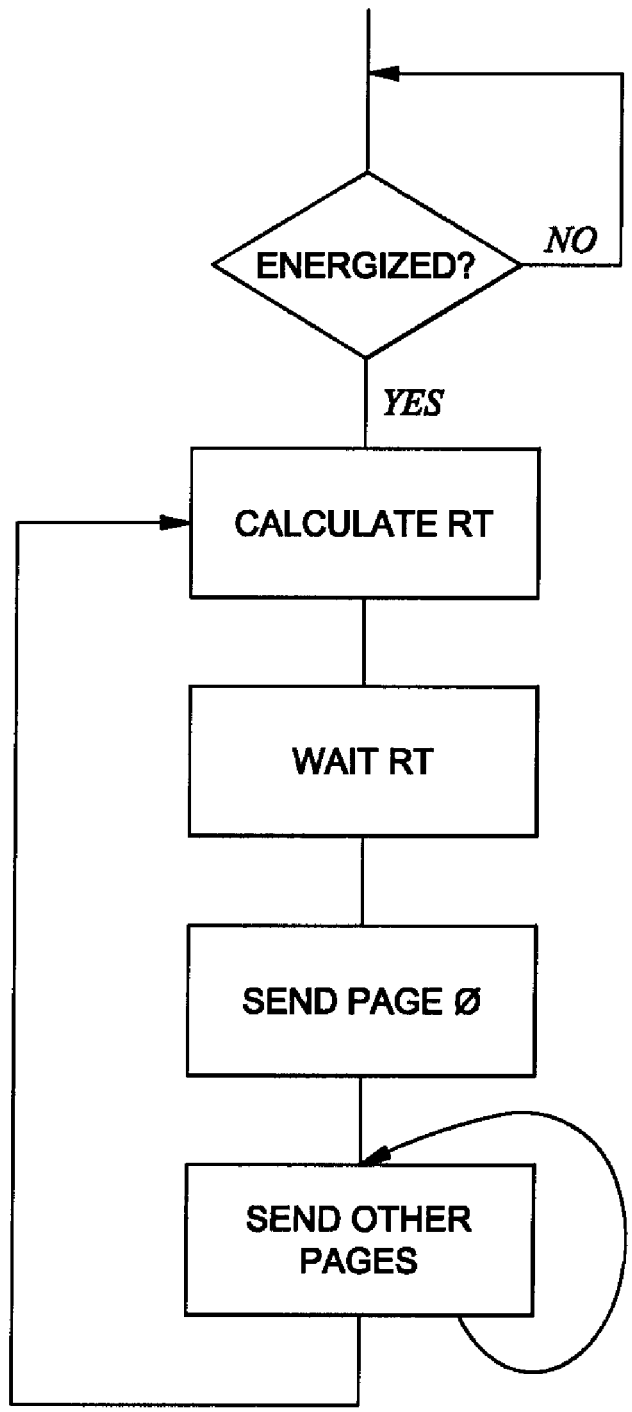
Figure 4:
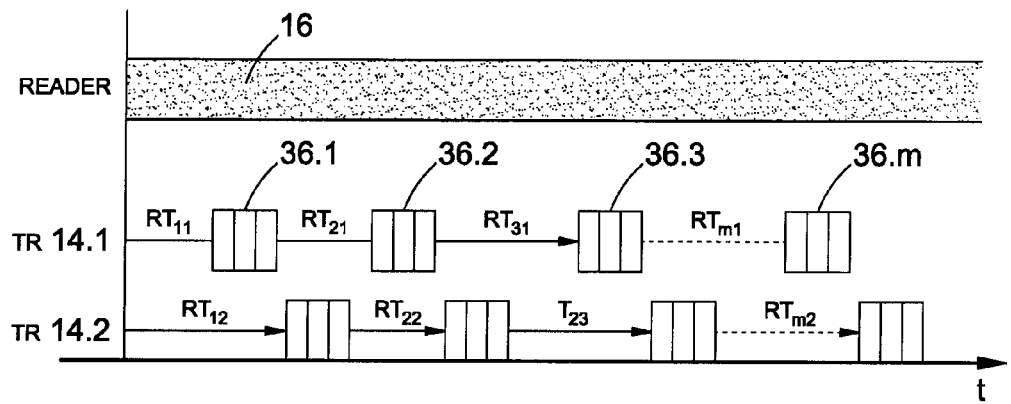
Figure 5:
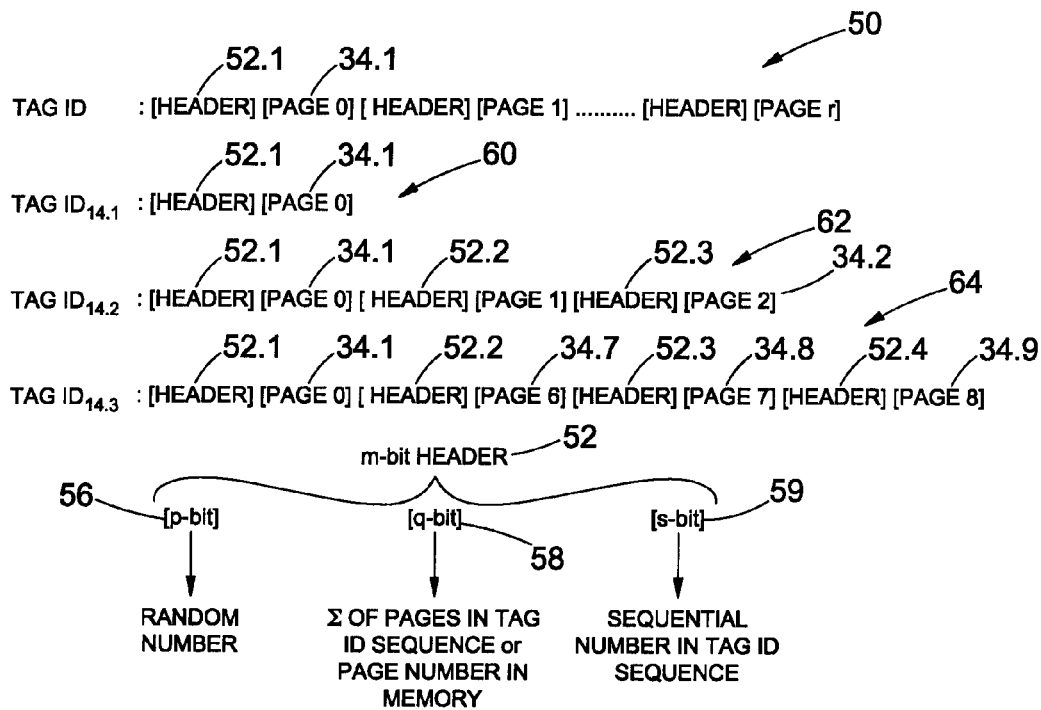

The invention will now further be described, by way of example only, with reference to the accompanying diagrams wherein
   FIG. 1 is a block diagram of a known radio frequency identification system;
   FIG. 2 is a basic block diagram of one transponder forming part of the system;
   FIG. 3 is a basic flow diagram of the operation of the transponder;
   FIG. 4 is representation against time of an energizing signal transmitted by a reader of the system and intermittent response signals transmitted by the transponders of the system; and
   FIG. 5 are graphic representations of generic transponder or tagID data and tagID data associated with three different transponders forming part of the system in FIG. 1.

DESCRIPTION OF A PREFERRED EMBODIMENT OF THE INVENTION

A known radio frequency identification system is generally designated by the reference numeral 10 in FIG. 1.

The system 10 comprises a reader 12 and a plurality of transponders 14.1 to 14.n of a transponder population 14. The transponders may be active transponders or passive transponders, which, in use, derive electrical power from an energizing signal generated by the reader 12. In some embodiments, the energizing signal may be a magnetic field generated by a loop antenna of the reader. In other embodiments, the energizing signal may be a propagating electromagnetic signal 16 broadcasted via the antenna 18 of the reader to remote transponders 14.1 to 14.n. Both these embodiments are known in the art.

Referring to FIG. 2, in the case of passive transponders such as transponder 14.1, the impinging energizing signal 16 at antenna 20 of the transponder is used at the transponder, to charge a charge storage device 22 on the transponder, thereby to provide electronic circuitry of the transponder with electrical power for their operation. The transponder further comprises a controller 24, a modulator 26, memory arrangement 28 and a random number generator 30. At least the controller 24, memory arrangement 28 and random number generator 30 may be integrated on an application specific integrated circuit (ASIC) or chip 32. The memory arrangement 28 is configured to store data in r-pages or blocks 34.1 to 34.r of k-bits each and each associated with a respective page number. In a preferred embodiment, k=64. At manufacture of the chip 32, there is permanently stored, burnt or otherwise locked into the first page 34.1 a chipID, which is a unique number relating to the chip 32.

Referring now to FIG. 4, in one known approach to reduce collisions between the response signals of a plurality of transponders 14.1 to 14.n and also to avoid interference between the reader 12 and the transponders, a so-called transponder talk only (TTO) protocol is used. According to this protocol, which is more fully described in U.S. Pat. No. 6,154,136 and the contents of which are incorporated herein by this reference, the reader 12 broadcasts energizing signal 16. When energized by the energization signal as aforesaid, each transponder 14.1 to 14.n automatically responds by repeatedly retransmitting signal bursts 36.1 to 36.m, each comprising transponder ID data associated with the relevant transponder. The controller 24 is operative to generate random inter-transmission intervals (RT) for separating any two consecutive signal bursts transmitted by that transponder. The inter-transmission intervals of transponder 14.1 are shown at $RT_{11}, RT_{21}$ to $RT_{m1}$ in FIG. 4 and those for transponder 14.2, at $RT_{12}, RT_{22}$ to $RT_{m2}$. Controller 24 is further operative to cause an average value of the inter-transmission intervals for a transponder to vary over a period of time, preferably to increase over time. It will be appreciated that in this protocol, the reader does not transmit data to cause one or more transponders to respond with respective response signals. This operation of transponder 14.1 is further illustrated in FIG. 3, which is self-explanatory.

The transponder ID data or TagID transmitted by the transponders is generically shown at 50 in FIG. 5. Each TagID comprises a substantially continuous, preferably continuous bit stream comprising a concatenation of pages comprising at least one page, preferably the first page (page 0) of the pages 34.1 to 34.r in the memory arrangement 28 and one other page and wherein a respective header 52.1 to 52.5 leads each page. The m-bit header 52 comprises a p-bit (preferably 8-bits) first part 56, a q-bit (preferably 4-bits) second part 58 and an s-bit (preferably 2-bits) third part 59. The first part 56 may comprise an 8-bit random number generated by RNG 30, which number may from time to time be changed, to inhibit splicing of data. The second part 58 may comprise a 4-bit number corresponding to the total number of pages in the TagID in the case of the header 52.1 for page 0, and the page number in memory arrangement 28 for a subsequent trailing page in the case of each of subsequent headers 52.2 to 52.r. The third part 59 may comprise a 2-bit sequential number of a page in the transponder ID or TagID.

The header 52 comprises at least the first part 56 and one or both of the second part 58 and third part 59.

For example, the $TagID_{14.1}$ of transponder 14.1 shown at 60 comprises a header 52.1 with the first part 56 comprising a first random number; the second part 58 comprising a number indicating that one page only (i.e. page 0 comprising the chipID) is transmitted; and the third part 59 comprising a sequential number indicating that the page is the first page in the TagID, followed by page 0, designated 34.1.

The $TagID_{14.2}$ of transponder 14.2 shown at 62 comprises a first header 52.1 with a first part 56 comprising a second random number; a second part 58 comprising a number indicating that a total of three (3) pages are being sent; and a third part 59 comprising a sequential number indicating that the page to follow is the first page in the TagID sequence, followed by page 0, designated 34.1; a second header 52.2 comprising a similar first part 56, a second part 58 indicting that page 1 (34.2) is following and a third part 59 comprising a sequential number indicating that the page to follow is the second page in the TagID sequence, followed by page 1; a third header 52.3 comprising a similar first part 56 and a second part 58 indicating that page 2 (34.3) is following, and a third part 59 comprising a sequential number indicating that the page to follow is the third page in the TagID sequence, followed by page 2, designated 34.2.

The $TagID_{14.3}$ of transponder 14.3 shown at 64 comprises a first header 52.1 with a first part 56 comprising a third random number; a second part 58 comprising a number indicating that a total of four (4) pages are being sent; and a third part 59 comprising a sequential number indicating that the page to follow is the first page in the TagID sequence, followed by page 0 designated 34.1; a second header 52.2 comprising a similar first part 56, a second part 58 comprising a number indicating that page 6 (34.7) is following and a third part 59 comprising a sequential number indicating that the page to follow is the second page in the TagID sequence, followed by page 6, designated 34.7; a third header 52.3 with a similar first part 56, a second part 58 indicating that page 7 designated 34.8 is following and a third part 59 comprising a sequential number indicating that the page to follow is the third page in the TagID sequence, followed by page 7, designated 34.8; and a fourth header 52.4 with a similar first part 56, a second part 58 indicating that page 8 designated 34.9 is following and a third part 59 comprising a sequential number indicating that the page to follow is the fourth page in the TagID sequence, followed by page 8, designated 34.9.

The invention claimed is:

1. A transponder of a radio frequency identification system comprising:
   a controller;
   a memory arrangement accessible by the controller and for storing r pages, wherein r>2, of k bits k bits of data each, a first page of the r-pages comprising an ID code relating to an integrated chip forming part of the transponder; and
   the controller being configured, after the transponder having been interrogated by a reader, to transmit transponder ID data comprising a concatenation of pages comprising the first page and at least one other page, wherein each of the first and the at least one other page of the concatenation of pages is led by a respective m bit header, the header for each of the first and the at least one other page of the concatenation of pages comprising at least a random number and one of: data relating to a number equal to a total number of pages in the transponder ID data; and respective data relating to a sequential number of the page in the transponder ID data.

2. The transponder as claimed in claim 1 wherein the transponder is configured to transmit the transponder ID data according to a transponder talk only protocol and wherein the transponder ID data is transmitted in a substantially continuous bit stream.

3. The transponder as claimed in claim 1 wherein the random number is generated by a random number generator (RNG) connected to the controller.

4. The transponder as claimed in claim 1 wherein the header for the first page comprises the random number and the data relating to a number equal to a total number of pages in the transponder ID data and wherein the header of any other page in the transponder ID data comprises the random number and respective data relating to a sequential number of the page in the transponder ID.

5. The transponder as claimed in claim 1 wherein each header further comprises data relating to a respective page number of the page in the memory arrangement.

6. An RFID system comprising a reader and at least one transponder as claimed in claim 1.

7. A method of reading a transponder forming part of a radio frequency identification system, the method comprising the steps of:

receiving an interrogation signal at the transponder; and transmitting, from the transponder, a response signal comprising transponder ID data comprising a concatenation of pages comprising at least a first page and one other page, wherein each of the first and the at least one other page of the concatenation of pages is led by a respective header, the header for each of the first and the at least one other page of the concatenation of pages comprising at least a random number and one of: data relating to a number equal to a total number of pages in the transponder ID data; and respective data relating to a sequential number of the page in the transponder ID data.

8. The method as claimed in claim 7 wherein the header for the first page comprises the random number and the data relating to a number equal to a total number of pages in the transponder ID data and wherein the header of any other page in the transponder ID data comprises the random number and respective data relating to a sequential number of the page in the transponder ID.

9. The method as claimed in claim 7 wherein each header further comprises data relating to a respective page number of the page in the memory arrangement.

\* \* \* \* \*

UNITED STATES PATENT AND TRADEMARK OFFICE
CERTIFICATE OF CORRECTION

PATENT NO.         : 8,087,586 B2
APPLICATION NO.    : 12/442082
DATED              : January 3, 2012
INVENTOR(S)        : Pretorius et al.

It is certified that error appears in the above-identified patent and that said Letters Patent is hereby corrected as shown below:

Title Page, Column 1, Item (73) Assignee, Line 1, delete "Africia" and insert -- Africa --

Column 4, Line 32, Claim 1, delete "k bits k bits" and insert -- k bits --

Signed and Sealed this
Twentieth Day of March, 2012

David J. Kappos
*Director of the United States Patent and Trademark Office*